US007277392B2

(12) United States Patent
Venteicher et al.

(10) Patent No.: US 7,277,392 B2
(45) Date of Patent: Oct. 2, 2007

(54) METHOD AND APPARATUS FOR MANAGING THE USAGE OF DATA LINK RESOURCES

(75) Inventors: Chris Venteicher, Williams Bay, WI (US); William Ryan, Algonquin, IL (US); Lawrence Willis, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 547 days.

(21) Appl. No.: 10/263,065

(22) Filed: Oct. 1, 2002

(65) Prior Publication Data
US 2004/0062262 A1   Apr. 1, 2004

(51) Int. Cl.
  *H04J 1/16*   (2006.01)
  *H04J 3/14*   (2006.01)
(52) U.S. Cl. .............. 370/237; 370/328; 370/437; 370/465; 455/452.2; 455/509; 455/517; 709/203; 709/226
(58) Field of Classification Search ........... 370/337, 370/348, 347, 437–441, 465–468, 319–329, 370/335–342; 455/452.2–450, 509–517; 709/227, 203–226
See application file for complete search history.

(56) References Cited

U.S. PATENT DOCUMENTS

| 5,953,338 | A | * | 9/1999 | Ma et al. ............... 370/395.21 |
| 5,982,324 | A | | 11/1999 | Watters et al. |
| 5,999,124 | A | | 12/1999 | Sheynblat |
| 6,005,852 | A | * | 12/1999 | Kokko et al. ............... 370/329 |
| 6,097,959 | A | | 8/2000 | Yost et al. |
| 6,154,657 | A | | 11/2000 | Grubeck et al. |
| 6,266,014 | B1 | | 7/2001 | Fattouche et al. |
| 6,317,584 | B1 | * | 11/2001 | Abu-Amara et al. ........ 455/12.1 |
| 6,490,271 | B1 | * | 12/2002 | Erjanne ....................... 370/347 |
| 6,522,629 | B1 | * | 2/2003 | Anderson, Sr. ............. 370/236 |
| 6,813,636 | B1 | * | 11/2004 | Bean et al. .................. 709/226 |
| 2003/0021264 | A1 | * | 1/2003 | Zhakov et al. .............. 370/352 |
| 2005/0015441 | A1 | * | 1/2005 | Attwood et al. ............ 709/203 |
| 2005/0015494 | A1 | * | 1/2005 | Adamczyk et al. ......... 709/226 |

FOREIGN PATENT DOCUMENTS

WO   WO 00/42445   7/2000

OTHER PUBLICATIONS

ETSI TS 101 527 V7.2.0 (May 2000) Technical Specification "Digital cellular telecommunication system (Phase 2+); Location Services (LCS); Mobile Station (MS)—Serving Mobile Location Centre (SMLC) Radio Resource LCS Protocol (RRLP) (GSM 04.31 version 7.2.0. Release 1998)" ETSI Global System For Mobile Communications.

* cited by examiner

*Primary Examiner*—Joseph Feild
*Assistant Examiner*—Inder Pal Mehra
(74) *Attorney, Agent, or Firm*—Lawrence J. Chapa

(57) ABSTRACT

The present invention manages data link resources in a wireless communication device by managing the data link resource needs of multiple client applications including the creation and sharing of data link resources. If the requested data link resources can be accommodated by the already established data link resources (106), then one or more of the already established data link resources are shared (108) with the application making the request for data link resources. If the requested data link resources can not be accommodated by the already established data link resources, then the data link resources are upgraded (110) to accommodate the additional requirements of the received request.

22 Claims, 9 Drawing Sheets

METHOD AND APPARATUS FOR MANAGING THE USAGE OF DATA LINK RESOURCES

FIELD OF THE INVENTION

The present invention relates generally to the management of data link resources in a wireless communication device operating in a cellular communication network and, more particularly, to managing the data link resource needs of multiple client applications including the creation and sharing of data link resources.

BACKGROUND OF THE INVENTION

Wireless communication devices, like cell phones, are becoming increasingly sophisticated, including the types of functions they perform and the types of communication resources required to support the increasingly sophisticated functions being performed. For example several current communication devices, not only support the transmission and receipt of electronic messages, but are increasingly incorporating web browsing capabilities. Other examples of other more recent types of client applications, that require communication resources, include audio and video streaming, as well as java and video gaming applications.

In some instances the communication requirements needed to support the client applications are non-continuous, in that the data is transferred in bursts, as necessary, which is often dictated by the user's activity level. In other instances the communication requirements are more constant. Examples, where the information transferred is more sporadic, includes interactive type services including E-mail and web browsing, where communications with the network occur when there is a message to be transferred or received, and/or when a user selects a link, while browsing the web, and downloads for display a new page of information. Examples, where the information transferred is more constant, includes streaming type services like audio or video download and playback.

Previously, data links for similar types of services have been largely supported by land based wired communication resources. Historically, these communication resources have consisted of a single link, which was of relatively fixed performance. The link was generally static in nature, and was billed based upon a connection time or a fixed fee.

Wireless data links are generally different. There are a multitude of competing connection points, that can be associated with different signaling methods, cost structures and services. Billing is often proportional to the number of bytes transferred and the maximum bandwidth that must be available. Moreover the requirements of the data link can be modified while in use. In other instances, specific types of data links may only be some times available. In these instances, this may be a function of geography and may correspond to the area of coverage provided by the network provider. In other instances, a particular type of data link may not be supported by the existing network equipment.

The multiple client applications, which requires communication resources and which are being executed by a wireless communication device, are not always aware of one another. The multiple client applications often seek to independently create and maintain data link resources, that satisfy their respective communication resource requirements. This can result in the creation and maintenance of additional resources, that are above and beyond what is minimally necessary, in terms of overall bandwidth and connection requirements.

Consequently, it would be beneficial to manage the creation and management of the data link resources, including the ability to create and share, new and existing resources between client applications that are aware, as well as unaware, of one another. It would be further beneficial, in addition to being capable of creating and maintaining a primary context data link resource, to be able to create and maintain a secondary context data link resource, and/or to be able to modify the quality of service of an existing data link resource, in a cost effective manner.

SUMMARY OF THE INVENTION

The present invention provides a method for managing the usage of data link resources, which communicatively couple a wireless communication device and a wireless network, and are used by one or more applications that operate in association with the wireless communication device. The method includes receiving a request for data link resources from an application and comparing the requested data link resources with the available resources associated with already established data links. A determination is then made whether the request for data link resources can be accommodated by the already established data link resources.

If the requested data link resources can be accommodated by the already established data link resources, then one or more of the already established data link resources is shared with the application making the request. If the requested data link resources can not be accommodated by the already established data link resources, then the data link resources are upgraded to accommodate the additional requirements of the received request.

In at least one embodiment, upgrading the data link resources to accommodate the additional requirements includes one or more of establishing a new primary context data link, establishing a new secondary context data link in association with an already existing primary context data link, and/or increasing the quality of service of an already established data link.

In at least a further embodiment, determining whether the request for data link resources can be accommodated by an already established data link includes determining whether the requested data link resources is for the same access point of an existing data link and determining whether the requested data link resources is for the same user of an existing data link. A determination is then made as to whether the application that already uses the existing data link, and the application that is requesting data link resources are willing to share a data link. A determination is then made as to whether the quality of service of the existing data link can support both the data link resource requirements of the applications that is already using the data link and the data link resource requirements of the application that is requesting the data link resources.

The present invention further provides a data link resource manager, which includes a processor and a storage unit coupled to said processor for storing one or more sets of prestored instructions for execution by the processor. The one or more sets of prestored instructions includes prestored instructions for receiving a request for data link resources from an application and comparing the requested data link resources with the available resources associated with the already established data links.

The one or more sets of prestored instructions further include prestored instructions for determining whether the request for data link resources can be accommodated by the already established data link resources, and if the requested data link resources can be accommodated by the already established data link resources, then sharing one or more of the already established data link resources with the application making the request, otherwise if the requested data link resources can not be accommodated by the already established data link resources, then upgrading the data link resources to accommodate the additional requirements of the received request.

In at least one of the embodiments, the processor unit is incorporated as part of a wireless communication device. In some of the embodiments, the application requesting resources is an application operating in the wireless communication device. In some of the same and other embodiments, the application requesting resources is an application operating in a separate external device, which is communicatively coupled to the wireless communication device.

The present invention further provides a data link resource manager, which includes a data session event handler coupled to one or more client application for receiving a request for data link resources. The data link resource manager further includes a proxy manager coupled to the data session event handler for creating a proxy instance. The proxy instance includes signaling contexts and protocol stacks for maintaining a data session. The data link resource manager still further includes a link manager coupled to the proxy manager for creating a link instance, which includes an interface for controlling the signaling context and a link protocol.

These and other features, and advantages of this invention are evident from the following description of one or more preferred embodiments of this invention, with reference to the accompanying drawings.

DETAILED DESCRIPTION OF THE PREFERRED EMBODIMENT(S)

Figure 1:
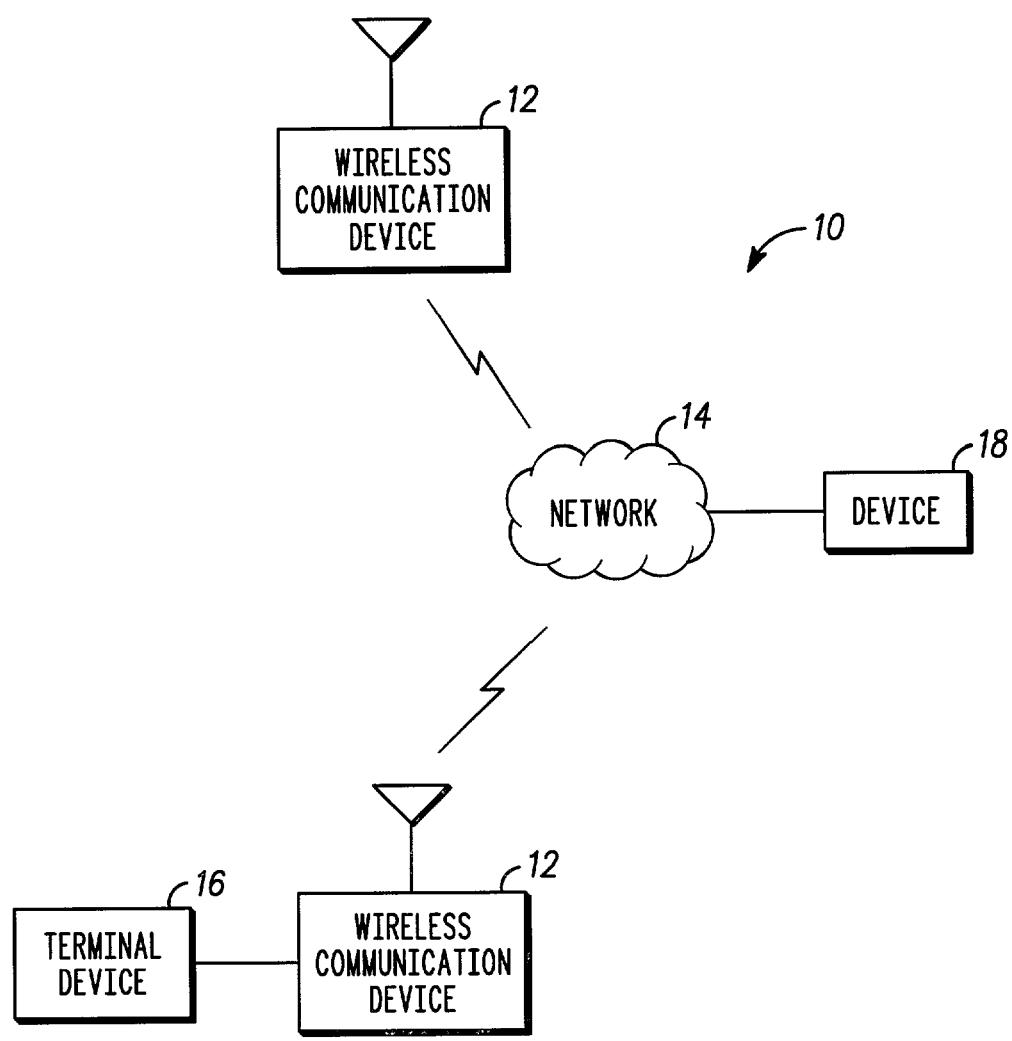
FIG. 1 is a block diagram of an exemplary wireless communication system.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram of an exemplary wireless communication system 10. The wireless communication system 10 illustrates a pair of wireless communication devices 12, which separately communicate wirelessly with a cellular network 14. One of the wireless communication devices 12 is coupled to a terminal device 16, which illustrates the possibility of a terminal device 16 being communicatively coupled to the wireless communication device 12 separate from the network 14. Additionally the terminal device 16 could be coupled to the network 14, via the wireless communication device 12. Possible examples of the terminal device 16 includes a personal computer, a printer, a scanner, a camera and/or a facsimile machine. One skilled in the art will readily appreciate that other types of terminal devices are possible. Furthermore the terminal device 16 can be coupled to the mobile device via a wired or a wireless communication connection. Examples of suitable wired and wireless connections include a Universal Serial Bus (USB) connection, a serial port connection, an infrared connection, a Bluetooth connection, or any other connection useful for communicating between two devices.

In addition to being coupled to wireless communication devices 12 via a wireless communication connection, the network could additionally or alternatively be communicatively coupled to other devices 18 within the system, via a wired or wireless connection.

The network 14 may include any type of network that is capable of sending and receiving communication signals. In at least one embodiment, the network 14 includes a wireless communication network. The network 14 may also include or be in communication with a data network, such as the Internet, an Intranet, a local area network (LAN), a wide area network (WAN), a cable network, and other like communication systems. The network 14 may also include or be in communication with a telecommunications network, such as a local telephone network, long distance telephone network, cellular telephone network, satellite communications network, cable television network and other like communications systems. Furthermore, the network 14 may include or be in communication with more than one network and may include a plurality of different types of networks. Thus, the network 14 may include or be in communication with a plurality of data networks, a plurality of telecommunications networks, a combination of data and telecommunications networks and other like communication systems.

Figure 2:
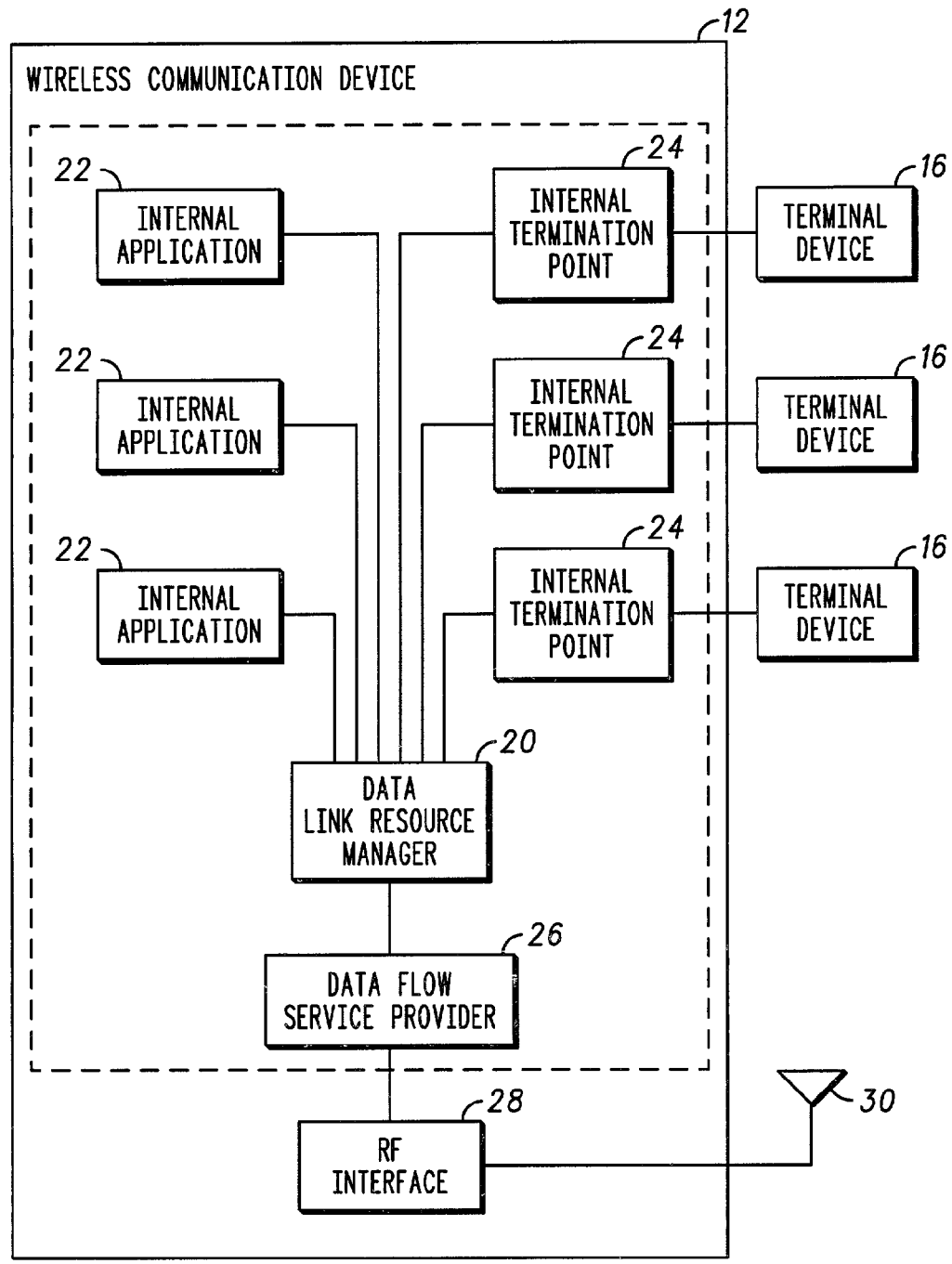
FIG. 2 is a block diagram of an exemplary wireless communication device.

FIG. 2 illustrates a more detailed block diagram of an exemplary wireless communication device, in accordance with the present invention. The wireless communication device includes a data link resource manager 20, which is coupled to one or more internal applications 22 and/or one or more internal termination points 24. The internal termination points 24 are respectively coupled to one or more terminal devices 26. In at least the illustrated embodiment, it is possible for a request for data link resources to be generated by either an application 22 operating internal to the wireless communication device 12 or by an external terminal device 16 coupled to the wireless communication device 12. The data link resource manager manages the requested data link resources between the internal applications 22 and the coupled external terminal devices 16, and the network 14.

The data link resource manager 20 is coupled to a data flow service provider 26 for creating and managing the data link resources via an RF interface 28 and an antenna 30.

The one or more internal applications 22, that are operating internal to the wireless communication device, could include a browser application, such as a web browser or a WAP browser. The internal applications 22 could additionally and/or alternatively include multimedia services including audio or video streaming, mail messages, instant messages, push messages, java based applications, GPS data, and/or synchronization data. The same or similar types of applications could be operating in connection with any terminal devices 16 coupled to the wireless communication device 12.

As each of the internal applications 22, and/or associated external devices 16 generate requests for data link resources, the data link resource manager 20 can attempt to accommodate the request for data link resources by sharing an already established data link, or the data link resource manager can attempt to establish a new data link connection. In some instances it may be possible and desirable to increase the quality of service of an already established data link in order to supply the requested data link resources. When establishing a data link connection there may be a choice between several types of data links dependant upon the type of data links supported by the network 14.

In at least one embodiment, at least four types of data links are available, including background, interactive, streaming or conversational type data links. A conversational type data link corresponds to a traditional voice switched circuit, which generally represents a dedicated wireless channel. Because the data link resources are reserved for the wireless communication device for this type of data link, regardless of the volume of data being transmitted via the data link, a conversational type data link is often one of the more expensive data link connections, cost wise. As a result, a conversational type data link is often the least desirable type of data link connection, and is sometimes treated as a last resort option. Because of the higher costs associated with this type of link, it is possible to set a flag in the data link resource manager to require user approval before connecting via this type of a link. The same type of flag could also be used with any of the other types of data links.

The remaining three types of data link connections associated with the disclosed embodiment include packet data protocols, which provide different levels of bit rates, error rates, error ratios and transfer delays. The background type of data link is generally a low data rate connection, that in at least some embodiments, is initiated when the wireless communication device is activated. Sometimes the background type of data link is referred to as "always on". The background or "always on" type of data connection allows some data communications requests to be met, without experiencing any of the delay associated with initially establishing a data link connection. One of the advantages of an "always on" type of connection, is that it allows for messages to be "pushed" to the wireless communication device 12, where the data communication may not have been initiated by the wireless communication device 12. For a couple of the types of internal applications specifically identified above, including mail and instant messaging applications, a background type of data link connection may be sufficient, and might be sufficient to be able to be shared by multiple low data intensive applications.

An interactive type of data link connections supports data communications that are more discontinuous, and/or they occur in bursts. The interactive type of data link can support different levels of data throughput. In at least one embodiment, interactive levels of each of low, medium and high, are supported. Generally for applications in which an interactive type of data link has been identified as being sufficient or suitable, the presence of transfer delays and/or a more consistent data throughput rate may be of less importance.

Where transfer delays or largely varying throughput rates would negatively impact the quality of the data transmission, for example in some audio or video streaming applications, it may be preferable to establish a streaming type data link connection. Similar to interactive type data link connections, it is possible to define multiple levels of streaming type data link communications. In at least one embodiment, low, medium and high are similarly supported. In some instances, the further distinction of real time and non-real time is further possible. A real time streaming data link connection will generally have a smaller transfer delay requirement.

The data link resource manager, in addition to including the general data transfer characteristics of each type of data link, will also sometimes include a monetary cost associated with creating and maintaining each type of data link. By including a cost comparison in the decision making process, the data link resource manager can create and maintain a more financially optimum combination of data link resources, while maintaining an expected level of performance. In some instances, the cost may vary, based upon time of day and/or the location of the wireless communication device within the network.

One skilled in the art will readily appreciate that in some instances, different combinations and/or different types of data link connections may be possible, than the specific combination of data link connections described in association with the illustrated embodiment, without departing from the teachings of the present invention. It may be further desirable to define a greater number of granulations than the low, medium and high for interactive and streaming, described in connection with the at least one embodiment. Furthermore one or more flags can be associated with any combination of the different types of data link connections, which would require that the user be prompted before establishing a corresponding type of data link connection.

In addition to there being the possibility of several types of data links, dependent upon the network it may be possible to establish both primary context data links and secondary context data links. A primary context data link corresponds to a first data link connection corresponding to a particular access point and a particular destination address/user identity. Any subsequent connection sharing the same access point and destination address/user identity will generally be a secondary context data link. Otherwise a secondary context data link and a primary context data link, are generally the same. In fact a secondary context data link can become a primary context data link, if the primary context data link is released, while a corresponding secondary context data link is maintained.

In some instances or areas the network may not support a secondary context data link. In these instances it may be necessary or more desirable to request a higher quality of service, in order to support an additional data link resource request.

Figure 3:
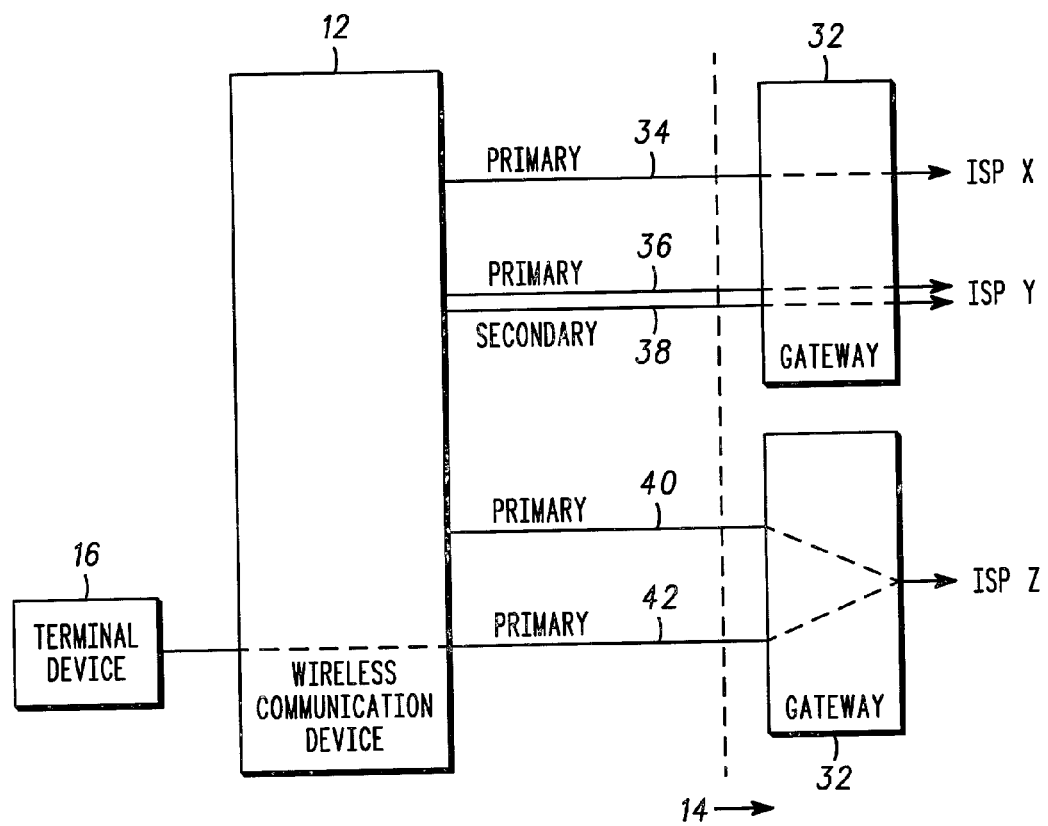
FIG. 3 is a block diagram illustrating one embodiment of a wireless communication device having a plurality of data link connections between the wireless communication device and the wireless communication network.

FIG. 3 illustrates a block diagram illustrating one embodiment of a wireless communication device having a plurality of data link connections between a wireless communication device 12 and the wireless communication network 14. With respect to at least one of the data link connections, wireless communication resources are made available to a terminal device 16 coupled to the wireless communication device.

In the illustrated embodiment at least five data link connections are illustrated. The five data link connections couple the wireless communication device 12 to the network 14, via a pair of gateways 32. A first data link connection 34, identified as a primary context data link, couples the wireless communication device 12 to ISP X, via gateway 32. A second data link connection 36, similarly identified as a primary context data link, couples the wireless communication device 12 to ISP Y, via gateway 32. ISP X and ISP Y represent different access points. As a result, data link connection 36 represents a primary context data connection. The third data link connection 38 couples the wireless communication device 12 to ISP Y. Because the third data link connection shares a common access point and a common destination address/user identity, the third data link 38 in the present example is referred to as a secondary context data connection.

The fourth data link connection 40, couples the wireless communication device 12 to ISP Z. The fifth data link connection 42, couples the terminal device 16 to ISP Z, via the wireless communication device 12. Because the fourth data link 40 and the fifth data link 42 do not share a common destination address/user identity, the fourth data link 40 and the fifth data link 42, are both considered primary.

Figure 4:
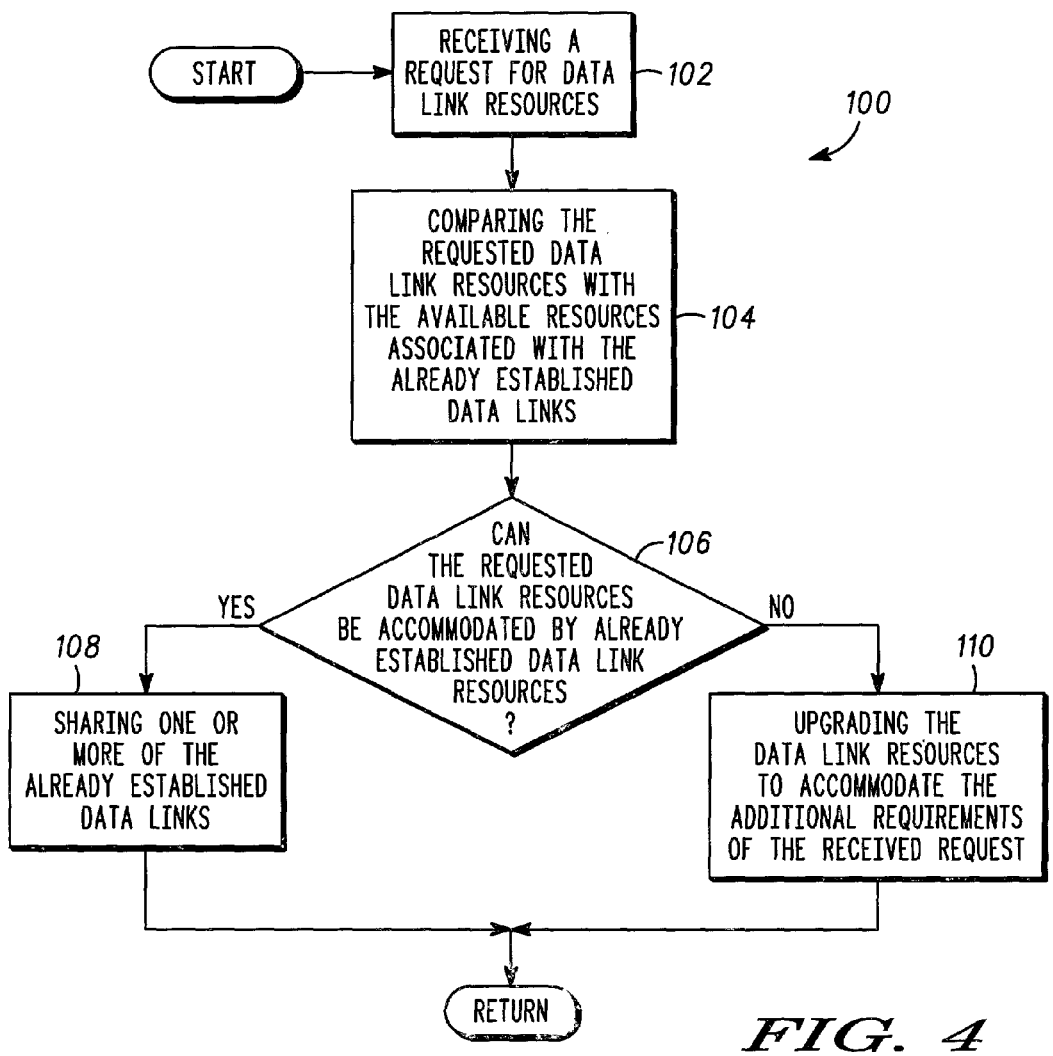
FIG. 4 is a flow diagram for a method for managing the usage of data link resources, in accordance with at least one embodiment of the present invention.

FIG. 4 illustrates a flow diagram for a method for managing the usage of data link resources, in accordance with at least one embodiment of the present invention. The method includes receiving a request for data link resources 102 and comparing the requested data link resources 104 with the available resources associated with the already established data links. A determination 106 is then made as to whether the request for data link resources can be accommodated by the already established data link resources. If the requested data link resources can be accommodated by the already established data link resources, then one or more of the already established data links are shared 108 with the requested data link resources. If the requested data link resources can not be accommodated by the already established data link resources, then the data link resources are upgraded 110 to accommodate the additional requirements of the received requests.

Figure 5:
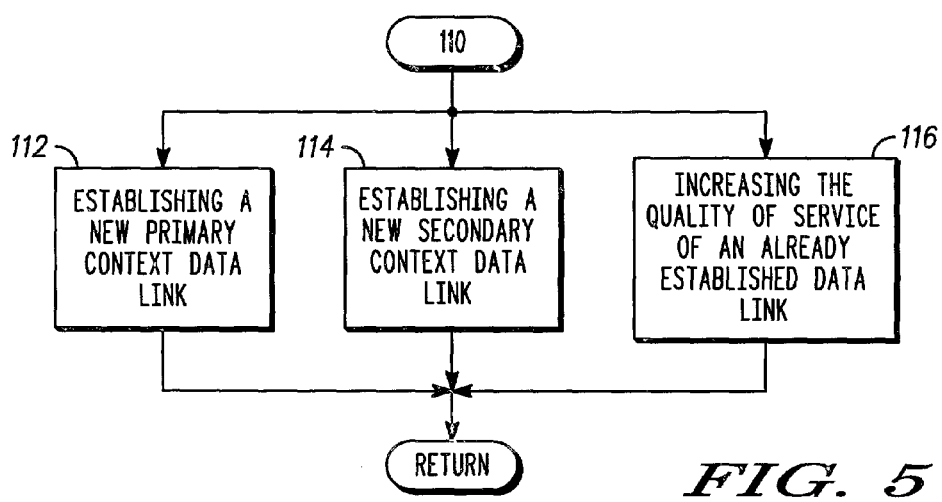
FIG. 5 is a more detailed flow diagram for upgrading the data link resources.

FIG. 5 illustrates a more detailed flow diagram for upgrading the data link resources in the event that the already established data link resources are unable to accommodate the requested data link resources. More specifically, one or more of a new primary context data link can be established 112, a new secondary context data link can be established 114, and/or the quality of service of an already established data link can be increased 116. As noted above any new data link will be a secondary context data link, if the newly established access point and the destination address/user identity are both in common with an already existing data link. Otherwise, any new link will be a primary context data link. In the event that secondary context data links are not allowed, and it is desirable to increase the capacity associated with an already existing primary context data link, then a request to increase the quality of service of the already established primary context data link can be made.

Figure 6:
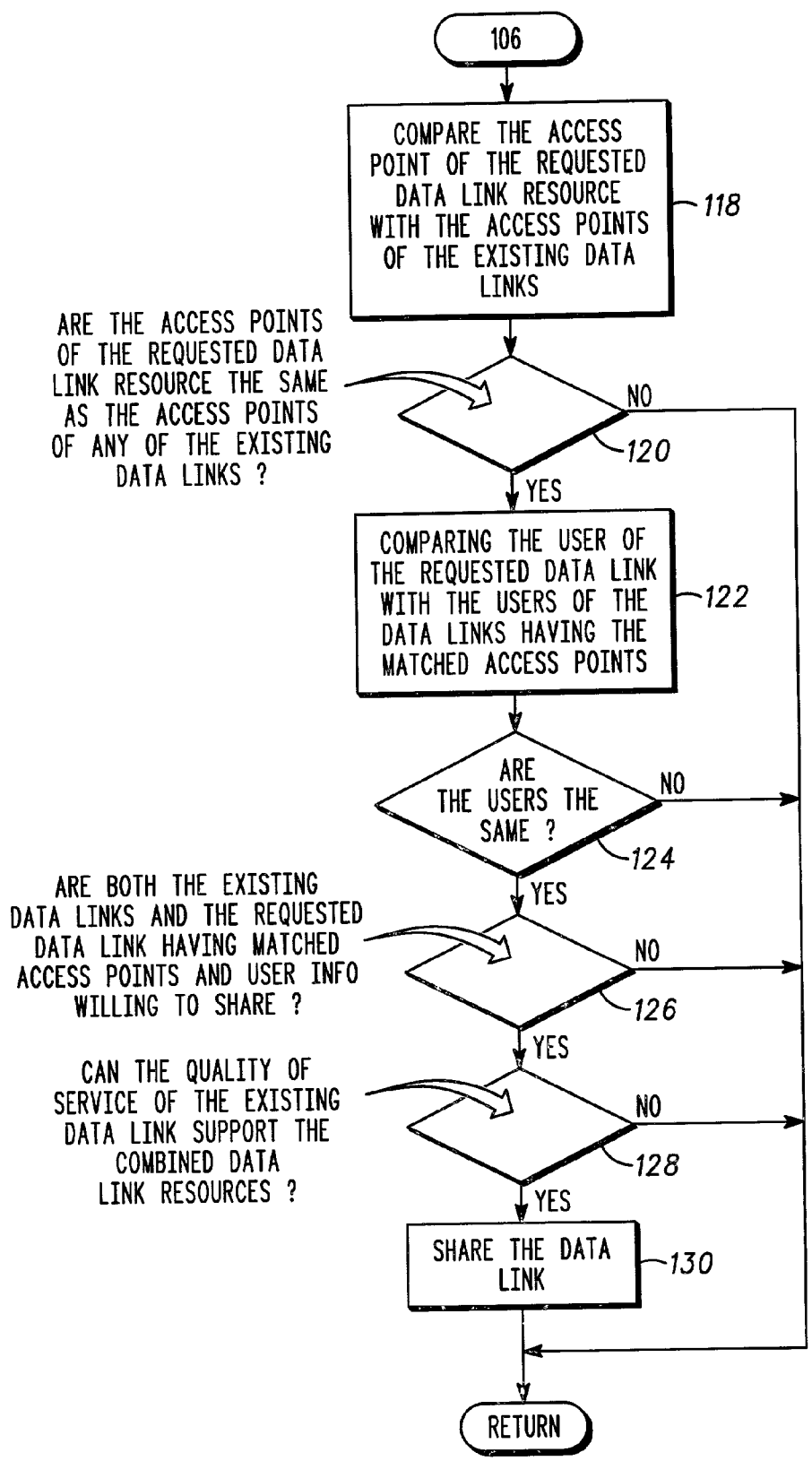
FIG. 6 is a more detailed flow diagram for determining whether the request for data link resources can be accommodated by an already established data link.

FIG. 6 illustrates a more detailed flow diagram for determining whether the request for data link resources can be accommodated 106 by an already established data link. More specifically, an evaluation is made as to whether an already existing data link can be shared with an application making a new request for data link resources. Initially, the requested access point of the requested data link resource is compared 118 with the access points of the already existing data links. If the requested access point of the requested data link resource is the same as the access points of any of the existing data links 120, then the requested destination address/user identity of the requested data link is compared to the destination address/user identity of the already existing data links having the matched access points 122.

If both the access point and the destination address/user identity is the same 124, a determination is made as to whether both the client of the already established matched data link and the client of the requested data link are willing to share a data link connection 126. If both of the clients are willing to share 126, then the quality of service of the already established and matched data link is compared to the combined data link resource requirements of the one or more clients already making use of the already established data link and the data link resource requirements of the one or more clients requesting data link services 128. If the current quality of service of the already established and matched data link is capable of meeting the combined data link resource requirements 128, then the data link is shared with the one or more clients making the request for data link resources 130.

While the data link resource manager can be used to dynamically increase or upgrade the data link resources being used, the data link resource manager additionally monitors usage levels, and if appropriate downgrades or decreases the acquired data link resources. In at least one embodiment, the data link resource manager uses a down link counter specific to a particular socket when determining whether to release or downgrade an existing data link resource. Each client application that shares a data link resource maintains a separate socket and corresponding count down timer. Correspondingly, the decision to adjust the count down timer is based upon any data transmission activity, or lack thereof, associated with a specific socket.

Figure 7:
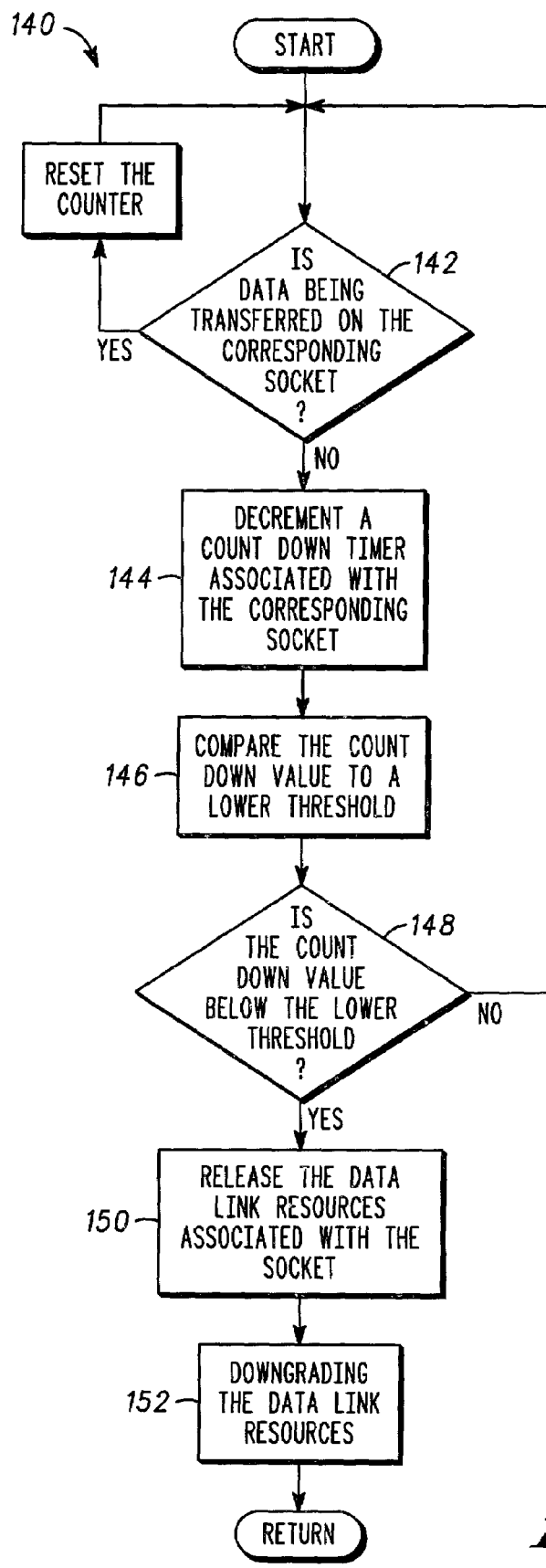
FIG. 7 is a more detailed flow diagram for decrementing the count down timer, when data is not being transferred on the corresponding socket.

FIG. 7 illustrates a more detailed flow diagram for decrementing the count down timer, when data is not being transferred on the corresponding socket. Initially a determination is made 142 as to whether data is being transferred on the corresponding socket. If no data is being transferred on the corresponding socket, then the respective count down timer is decremented 144. The count down value is then compared 146 to a predetermined lower threshold value. If the count is below the predetermined lower threshold value 148, then the data link resources associated with the socket are released 150. In at least one embodiment the lower threshold value is reached, when the counter reaches zero.

After the data link resources associated with the socket have been released, then the data link resources are evaluated to determine whether they can be down graded 152. For example, the quality of service can be down graded, if an alternative lower cost data link resource is available, that can satisfy the remaining resource requirements of the data link. If there are no remaining resource requirements associated with the data link, then the data link can be released.

One of the benefits associated with the present invention, where the data link resources are managed by a data link resource manager includes the ability to support non-signaling aware clients. In some instances, a particular client may not be aware of the specific data link and/or the associated information necessary for establishing a connection with the data link. In these instances a default set of parameters, stored in association with the data link resource manager, is provided. Use of some or all of the parameters associated with a default data link will allow for a data link connection to be established for a client application that does not specify some or all of the data link parameters. This may be particularly useful in instances where a non-wireless external device is coupled to the network, via the wireless communication device 12. In at least some of these instances, the device may be unaware of the specific requirements for identifying a suitable data link for making a connection in a wireless communication network.

Additionally, this may make it possible for non-signaling aware applications to share a data link. Furthermore, while a default set of parameters may be initially provided, the user can establish one or more alternative default parameters, as well as define the conditions in which each set of default parameters apply. A default set of parameters additionally safeguards against a non-signaling aware client from inadvertently attempting to establish a connection, which may be specific to other services, applications, or billing methods.

A list of examples of possible parameters used in establishing a data link includes a user name and a password, an identification of the bearer type associated with the link (GPRS, GSM Circuit Switched Data, etc.), the phone number of the access point, the data rate to use when establishing a circuit switched data connection, the line type (modem, ISDN, etc.) to use when establishing a circuit switched data connection, the time in seconds to wait before deactivating an idle data link, and/or a flag to indicate if the user should be notified before this type of data link is established as well as identifying to the user any corresponding charges.

Figure 8:
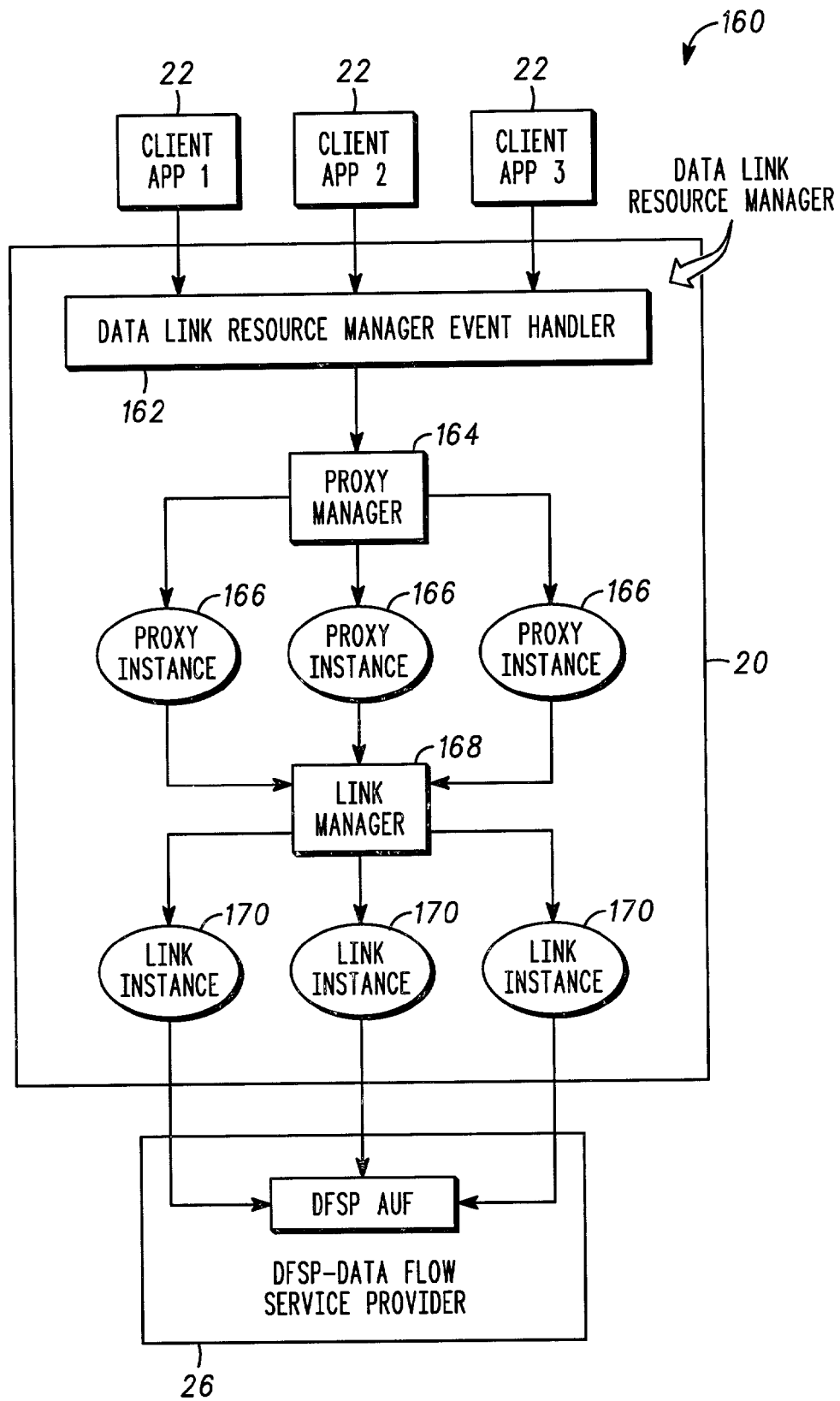
FIG. 8 is a block diagram of a data link resource manager in accordance with the present invention.

FIG. 8 is a block diagram 160 including a more specific block diagram of the data link resource manager 20, in accordance with at least one embodiment of the present invention. The data link resource manager 20 includes a data link resource manager event handler 162. The data link resource manager event handler 162 is coupled to each of the individual client application 22, and receives the request for data link resources. The data link resource manager event handler 162 is coupled to a proxy manager 164, which provides client isolation by creating a separate proxy instance 166 for each client application 22 requesting data link resources.

The proxy instance 166 establishes the signaling contexts and protocol stacks as needed for maintaining the data session. The proxies are configured from a default proxy descriptor, which can be stored in memory or from a set of attributes and an attribute interface. In at least one embodiment the default proxy descriptor is stored in a non-volatile memory. However other types of memory could alternatively be used. After initialization the proxy maintains the required information and manages the data links and protocol stacks.

The proxy instances 166 are coupled to a link manager 168. In turn, the link manager creates a corresponding link instance 170. The proxy instance 166 will establish a data link, when the client 22 application requires a network 14 connection. The data link instance 170 provides the interface to control a signaling context and link protocol for maintaining a data link to the network 14. The data link instance will make use of a calling application (FIG. 9), coupled to the data link resource manager 20, in order to establish a signaling context with the network 14. The data link instance will then encapsulate the state of the signaling context as well as the parameters used to establish the signaling context.

Figure 9:
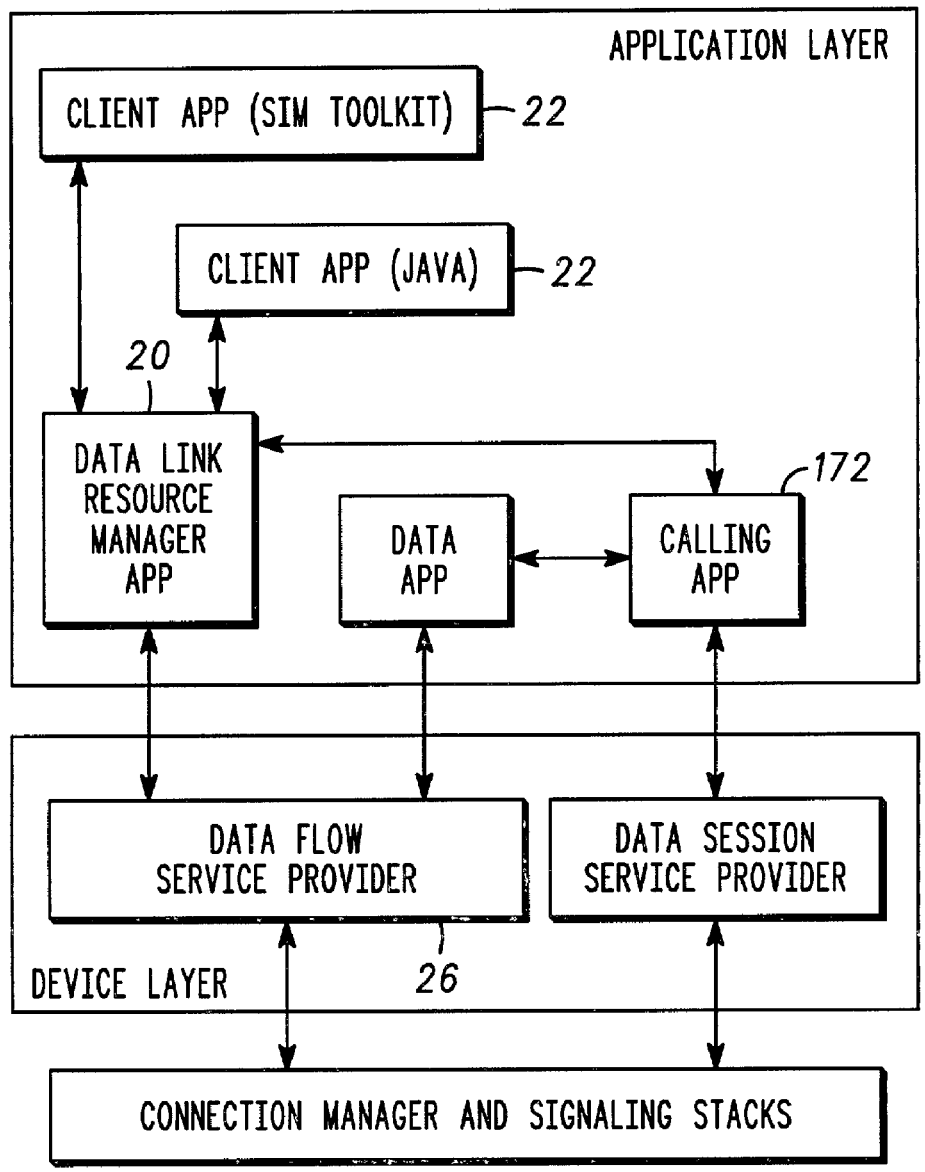
FIG. 9 is a block diagram of the processing architecture of the multiple operational layers for creating and maintaining data link resources between a wireless communication device and the wireless communication network, incorporating the data link resource manager illustrated in FIG. 8.

FIG. 9 is a block diagram 180 of the processing architecture of the multiple operational layers for creating and maintaining data link resources between a wireless communication device and the wireless communication network, which incorporates the data link resource manager 20 of the present application.

Figure 10:
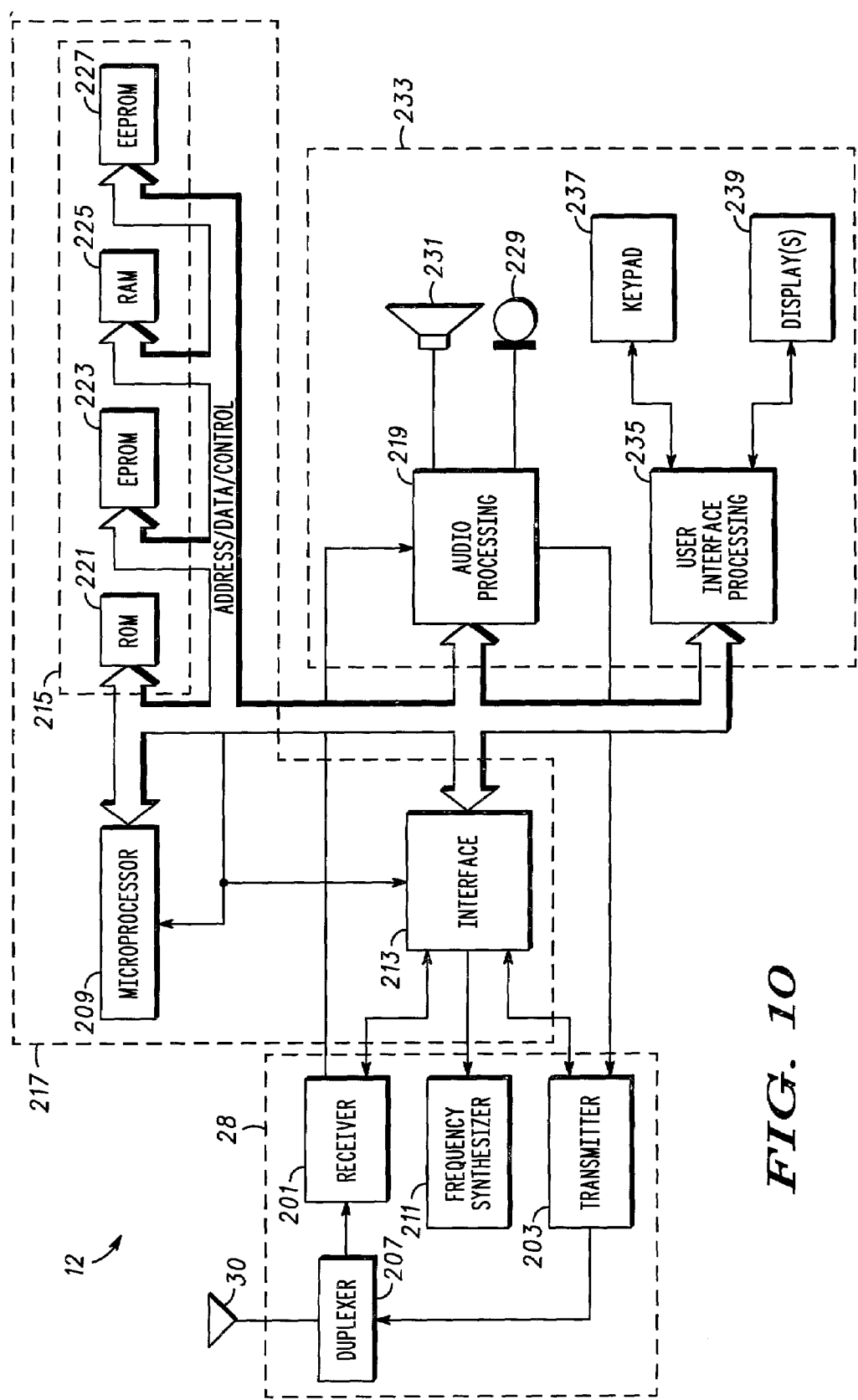
FIG. 10 is a block diagram of a wireless communication device within which the present invention can be incorporated.

FIG. 10 is a block diagram of a wireless communication device 12 within which the present invention can be incorporated. The wireless communication device includes an RF interface 28 having a radio receiver 201 and a transmitter 203. Both the receiver 201 and the transrmitter 203 are coupled to an antenna 30 of the wireless communication device by way of a duplexer 207. The particular radio frequency to be used by the transmitter 203 and the receiver 201 is determined by the microprocessor 209 and conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213.

In the preferred embodiment, the microprocessor 209 forms part of the processing unit 217, which in conjunction with the interface circuitry 213 performs the necessary processing functions under the control of programs and default sets of parameters stored in a memory section 215. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Characterizing features of the wireless communication device are typically stored in EEPROM 227 (which may also be stored in the microprocessor in an on-board EEPROM, if available) and can include the number assignment (NAM) required for operation in a conventional cellular system and/or the base identification (BID) required for operation with a cordless base. Additionally included in the memory section 215 are prestored instructions determining whether a request for data link resources can be accommodated by the already established data link resources, and prestored instructions for alternatively sharing one or more of the already established data link resources with the application making the request or upgrading the data link resources to accommodate the additional requirements of the received request.

Control of the user audio, including the microphone 229 and the speaker 231, is controlled by audio processing circuitry 219, which forms part of a user interface circuit 233. The user interface circuit 233 additionally includes user interface processing circuitry 235, which manages the operation of any keypad(s) 237 and/or display(s) 239. It is further envisioned that any keypad operation could be included as part of a touch sensitive display.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for managing usage of data link resources associated with one or more data links, communicatively coupling a wireless communication device and a wireless network, being used by one or more applications operating in association with the wireless communication device comprising:
   receiving a request for data link resources from an application;
   comparing the requested data link resources with available data link resources associated with already established data links;
   determining whether the request for data link resources can be accommodated by the already established data links;
   if the requested data link resources can be accommodated by the already established data links, then sharing one or more of the already established data links with die application making the request;
   if the requested data link resources can not be accommodated by the already established data links, then the available data link resources are upgraded to accommodate the requested data link resources.

2. The method in accordance with claim 1 wherein upgrading the available data link resources to accommodate the requested data link resources includes one or more of
   establishing a new primary context data link,
   establishing anew secondary context data link in association with an already existing primary context data link, and
   increasing a quality of service of an already established data link.

3. The method in accordance with claim 2 wherein when establishing a new primary or secondary context data link, a cost of different types of data links, which will accommodate the requested data link resources is compared with each other, and the data link which accommodates the requested data link resources and has the lowest cost is selected.

4. The method in accordance with claim 2 wherein the quality of service of a data link is defined as different levels of background, interactive, streaming or conversational.

5. The method in accordance with claim 4 wherein each of the different levels of interactive or streaming includes low, medium and high levels of service quality.

6. The method in accordance with claim 4 wherein streaming is distinguished between real time and non-real time, which is used to define differences in transfer delays relative to a predefined threshold.

7. The method in accordance with claim 2 wherein upgrading the data link resources to accommodate the requested data link resources additionally includes
   checking a flag associated with the type of data link being established or the type of data link having the quality of service increased,
   if the flag is set, then prompting a user of the wireless communication device for authorization to establish or increase the quality of service of the data link.

8. The method in accordance with claim 2 wherein establishing the new secondary context data link includes establishing a data link having a common address and access point as an already existing primary context data link.

9. The method in accordance with claim 1 wherein establishing a new data link or sharing one or more of the already established data links includes creating an additional socket, on each of the one or more data links being established or shared.

10. The method in accordance with claim 9 wherein the additional socket includes a count down timer having a value, which is decremented when data is not being transferred on the additional socket.

11. The method in accordance with claim 10 wherein decrementing the count down timer includes, comparing the value of the count down timer to a lower threshold, and if the value is lower than the lower threshold, then releasing the data link resources associated with the additional socket.

12. The method in accordance with claim 11 wherein releasing the data link resources associated with the socket includes downgrading the available data link resources including one or more of:
   decreasing the (quality of service of an already established data link for which associated data link resources have been released to a level of service which minimally accommodates any associated non-released data link resources, and
   terminating a data link for which all of the associated data link resources have been released.

13. The method in accordance with claim 12 wherein decreasing the quality of service of an already established data link includes switching to a more cost effective data link, where the more cost effective data link can support the associated non-released data link resources.

14. The method in accordance with claim 1 wherein determining whether the request for data link resources can be accommodated by an already established data link includes:
   determining whether the requested data link resources are for an access point which is same as an access point for an already established data link;
   determining whether the requested data link resources are for a user which is same as a user for an already established data link;
   determining whether the one or more applications already using the already established data link, and die application requesting data link resources are willing to share a data link; and
   determining whether a quality of service of the already established data link can support both data link resources of the one or more applications already using the data link and the requested data link resources of the application requesting data link resources.

15. The method in accordance with claim 1 wherein receiving a request for data link resources includes
   receiving a set of parameters defining requirements for the data link resources being requested, and
   supplying from a default list of parameters any parameters, which are missing from the set of parameters received.

16. A data link resource manager comprising:
   a processor;
   a storage unit coupled to said processor for storing one or more sets of instructions for execution by the processor including
   prestored instructions for receiving a request for data link resources from an application and comparing the requested data link resources with available data link resources associated with already established data links; and
   prestored instructions for determining whether the request for data link resources can be accommodated by the already established data link resources, and if the requested data link resources can be accommodated by the already established data link resources, then sharing one or more of the already established data link resources with the application making the request, otherwise if the requested data link resources can not be accommodated by the already established data link resources, ten upgrading the available data link resources to accommodate the requested data link resources.

17. The data link resource manager of claim 16 wherein prestored instructions which upgrade the available data link resources to accommodate the requested data link resources includes prestored instructions for one or more of selectively establishing a new primary context data link, selectively establishing a new secondary context data link in association with an already existing primary context data link, and selectively increasing a quality of service of an already established data link.

18. The data link resource manager of claim 16 wherein the data link resource manager is incorporated as pad or a wireless communication device.

19. The data link resource manager of claim 18 wherein the application requesting resources is an application operating in a separate external device communicatively coupled to the wireless communication device.

20. The data link resource manager of claim 18 wherein the application requesting resources is an application operating in the wireless communication device.

21. A data link resource manager comprising:

a data session event handler coupled to one or more client applications for receiving a request for data link resources;

a proxy manager coupled to the data session event handler for creating a proxy instance including a signaling context and one or more protocol stacks for maintaining a data session; and a link manager coupled to the proxy manager for creating a link instance including an interface for controlling the signaling context and a link protocol.

22. A data link resource manager of claim 21 wherein the proxy manager includes a default proxy descriptor including a set of default parameters for establishing a data session in absence of one or more parameters from the one or more client applications, when the one or more client applications are making a request for data link resources.

* * * * *